(12) United States Patent
Matekunas et al.

(10) Patent No.: US 7,669,584 B2
(45) Date of Patent: Mar. 2, 2010

(54) METHOD AND APPARATUS FOR DETERMINING PISTON POSITION IN AN ENGINE

(75) Inventors: Frederic Anton Matekunas, Troy, MI (US); Paul Anthony Battiston, Clinton Township, MI (US); Patrick G. Szymkowicz, Shelby Township, MI (US); Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/739,190

(22) Filed: Apr. 24, 2007

(65) Prior Publication Data

US 2007/0250255 A1   Oct. 25, 2007

Related U.S. Application Data

(60) Provisional application No. 60/794,411, filed on Apr. 24, 2006.

(51) Int. Cl.
    *F02M 7/00* (2006.01)
(52) U.S. Cl. .................................... 123/435; 73/114.16
(58) Field of Classification Search ................ 123/435, 123/437, 434, 674, 679, 690; 73/114.16; 701/104, 114, 101, 102, 103, 106, 107; 137/479; 261/38
    See application file for complete search history.

(56) References Cited

U.S. PATENT DOCUMENTS

| | | | |
|---|---|---|---|
| 4,179,922 A | * | 12/1979 | Bouverie et al. ......... 73/114.03 |
| 4,389,882 A | * | 6/1983 | Noro et al. ............... 73/114.79 |
| 4,621,603 A | | 11/1986 | Matekunas |
| 4,622,939 A | | 11/1986 | Matekunas |
| 4,624,229 A | | 11/1986 | Matekunas |
| 4,940,033 A | | 7/1990 | Plee et al. |
| 5,038,737 A | | 8/1991 | Nishimaya et al. |
| 5,450,829 A | | 9/1995 | Beck |
| 6,376,927 B1 | | 4/2002 | Tamai et al. |
| 6,411,038 B2 | | 6/2002 | Murai et al. |
| 6,659,073 B1 | | 12/2003 | Franke et al. |
| 7,146,964 B2 | | 12/2006 | Norimoto et al. |
| 2005/0187700 A1 | | 8/2005 | Jacobson |

(Continued)

FOREIGN PATENT DOCUMENTS

JP          2005-61239 A           3/2005

OTHER PUBLICATIONS

Sellnau,M;Cyl. Pressure-Based Engine Control using Pressure Ratio Management;SAE 2000-01-0932; 2000;Soc.Auto.Engrg; Warrendale, PA, USA.

*Primary Examiner*—Stephen K Cronin
*Assistant Examiner*—Keith Coleman

(57) ABSTRACT

The invention comprises a method to determine a position of a piston in a cylinder of an engine during ongoing operation, comprising adapting pressure sensing devices to monitor in-cylinder pressure, and, operating the engine. In-cylinder pressure is monitored along with a corresponding engine crank position. The engine is operated in a motoring mode and in a cylinder firing mode, and a plurality of instantaneous in-cylinder pressure states are determined during compression and expansion strokes. Pressure ratios are determined based upon the instantaneous in-cylinder pressure states, which are used to determine an engine crank angle and compression ratio error and, adjust the monitored engine crank position based upon the crank angle error and readjust engine operation according to these sensed errors.

16 Claims, 3 Drawing Sheets

U.S. PATENT DOCUMENTS

2005/0251322 A1     11/2005  Wang et al.
2006/0293829 A1 *  12/2006  Cornwell et al. ............ 701/114
2007/0186905 A1 *   8/2007  Caretta et al. ............... 123/435
2008/0105233 A1 *   5/2008  Koeller et al. ............... 123/435

* cited by examiner

METHOD AND APPARATUS FOR DETERMINING PISTON POSITION IN AN ENGINE

CROSS REFERENCE TO RELATED APPLICATIONS

This application claims priority from U.S. Provisional Application No. 60/794,411, filed Apr. 24, 2006, entitled ENGINE CONTROL.

TECHNICAL FIELD

This invention relates to operation and control of internal combustion engines, primarily compression-ignition engines.

BACKGROUND OF THE INVENTION

The statements in this section merely provide background information related to the present disclosure and may not constitute prior art.

Engines operating lean of stoichiometry, including compression-ignition engines and controlled auto-ignition engines (e.g., HCCI), offer benefits including improved fuel economy. Manufacturers of vehicles, including passenger cars, commercial trucks, construction, and agricultural tractors, must meet stringent emissions requirements to market their products.

Various aspects of internal combustion engine controls are known which rely on measurements that are indicative of in-cylinder pressure, particularly location of peak pressure (LPP), indicated mean effective pressure (IMEP), and absolute peak pressure.

Manufacturing variations, including part-to-part variations and assembly variation, sensor degradation, and engine component wear all may lead to differences in compression ratio and errors between sensed crank position and actual rotational position of the pistons and crankshaft, between an actual rotational position of the crankshaft and piston, and a rotational position that is sensed using conventional crank sensor technology.

Timing of fuel injection relative to piston position is used to control ignition and combustion timing in diesel engines. Injection timing during the main compression stroke is the main alternative control option for controlling ignition timing in diesel engines. Accurate detection of piston position and injection of fuel are necessary for optimal operation of the engine and for improved emissions performance and fuel economy.

There is a need to control injection timing in a compression-ignition engine, improving emissions performance and fuel economy, and minimizing engine noise.

SUMMARY OF THE INVENTION

In accordance with an embodiment of the invention, there is provided a method and system to determine a position of a piston in a cylinder of an engine. The engine include a direct-injection, four-stroke internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles with each cycle comprising intake, compression, expansion, and exhaust strokes. The method includes adapting a plurality of pressure sensing devices to monitor in-cylinder pressure during ongoing operation, and, operating the engine lean of stoichiometry. In-cylinder pressure is monitored along with a corresponding engine crank position. The engine is operated in a motoring mode, and a plurality of instantaneous in-cylinder pressure states are determined during the compression and expansion strokes. The engine is operated in a cylinder firing mode, and a plurality of instantaneous in-cylinder pressure states are determined during the compression and expansion strokes. Pressure ratios are determined based upon the instantaneous in-cylinder pressure states, from which an engine crank angle error is determined. The engine crank angle error is used to adjust the monitored engine crank position based upon the crank angle error.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
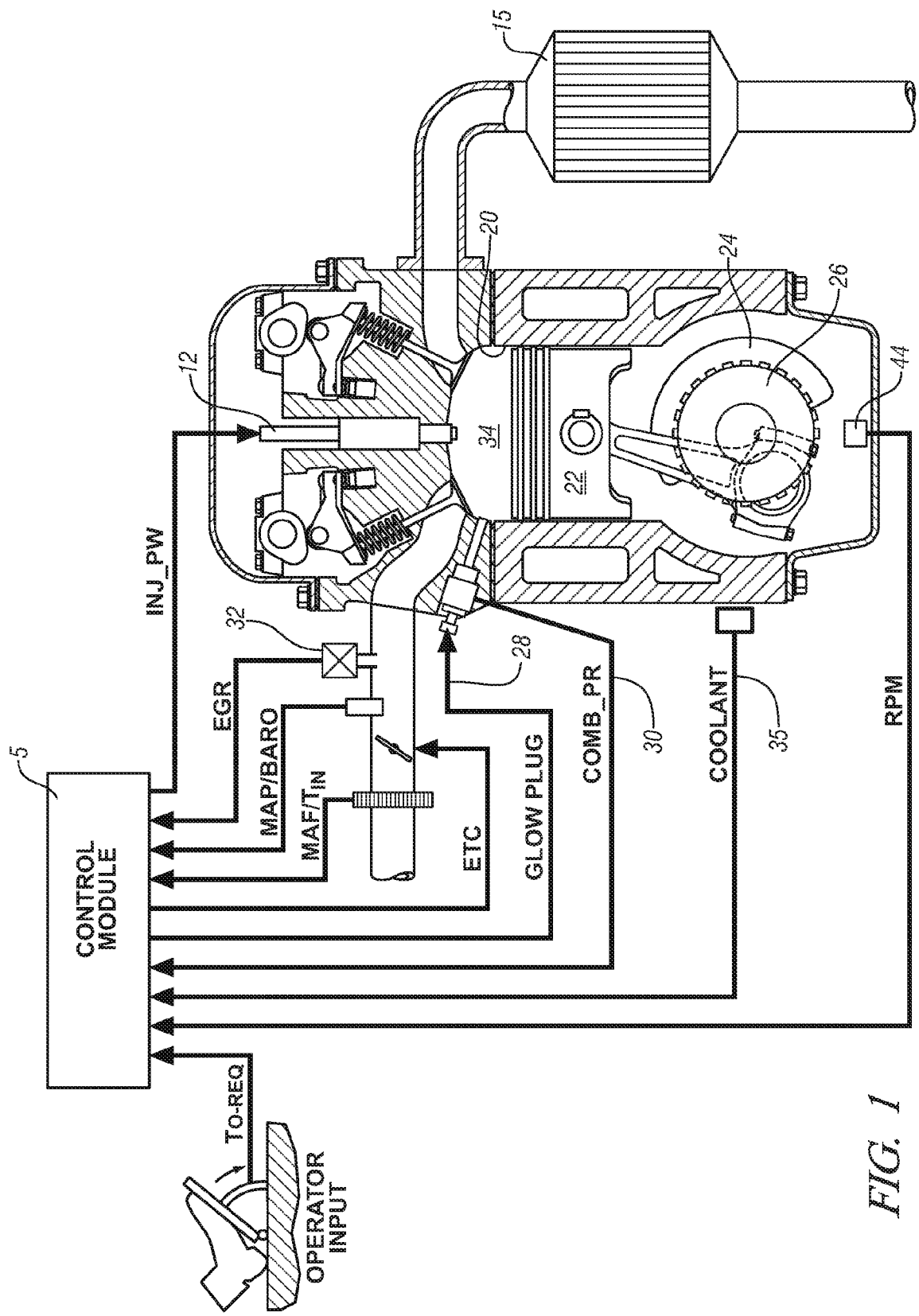
FIG. 1 is a schematic drawing of an engine, in accordance with an embodiment of the invention; and, FIGS. 2-4 are data graphs, in accordance with an embodiment of the invention.

Referring now to the drawings, wherein the depictions are for the purpose of illustrating embodiments of the invention only and not for the purpose of limiting the same, FIG. 1 comprises a schematic diagram depicting an internal combustion engine, control module 5, and exhaust aftertreatment system 15, constructed in accordance with an embodiment of the invention.

The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (T$_{O\_REQ}$). The engine preferably employs a four-stroke operation wherein each engine combustion cycle comprises 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably has an air/fuel operating regime that is primarily lean of stoichiometry. The skilled practitioner understands that aspects of the invention are applicable to other engine configurations e.g., spark-ignition engines. During normal operation of the compression-ignition engine, a combustion event occurs during each engine cycle when a fuel charge is injected into the combustion chamber to form, with the intake air, the cylinder charge. The cylinder charge is subsequently combusted by action of compression thereof during the compression stroke.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor (not shown) for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, $T_{O\_REQ}$, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 are supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event. Event-based algorithms and engine operation include pressure monitoring from the combustion sensor 30, wherein measurements are taken corresponding to each tooth passing on the crank wheel 26. Thus, when the crank wheel comprises a 60×-2×, i.e., a 58× wheel, combustion sensing occurs each six degrees of crankshaft rotation, with one tooth and measurement corresponding to crank setting at 0 TDC for each piston.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $T_{O\_REQ}$, and from the sensors indicating the engine speed (RPM) and intake air temperature ($T_{IN}$), and coolant temperature and other ambient conditions. The control module 5 determines instantaneous control settings for fuel injection mass and timing, EGR valve position, and, intake and exhaust valve phasing and lift set points from lookup tables in memory.

Overall, the invention comprises a method to determine a position of a piston in a cylinder of the exemplary engine during ongoing operation. The engine comprises a direct-injection, four-stroke internal combustion engine including a variable volume combustion chamber defined by the piston reciprocating within the cylinder between top-dead-center and bottom-dead-center points and a cylinder head comprising an intake valve and an exhaust valve; the piston reciprocating in repetitive cycles each cycle comprising intake, compression, expansion, and exhaust strokes. The method comprises adapting a plurality of the pressure sensing devices 30 to monitor in-cylinder pressure during ongoing operation, when operating the engine lean of stoichiometry. The in-cylinder pressure is monitored, with a corresponding engine crank position measured by the crank sensor. The engine is operated in a motoring mode and instantaneous in-cylinder pressure states are determined during the compression and expansion strokes. The engine is operated with cylinders firing and instantaneous in-cylinder pressure states are again determined during the compression and expansion strokes. Pressure ratios based upon the instantaneous in-cylinder pressure states, and a crank angle error is calculated based upon the pressure ratios. The monitored engine crank position is adjusted based upon the crank angle error.

The engine is preferably operated in a motoring mode during ongoing operation by disabling fuel flow during deceleration events, often referred to as 'decel fuel cutoff' events, to monitor and determine instantaneous in-cylinder pressure states during the compression and expansion strokes. The engine can be operated in a motoring mode in an engine assembly plant by motoring the engine with an attached dynamometer to spin the engine. When the engine is operably connected to an electro-mechanical transmission or other hybrid powertrain device, the fuel flow can be disabled during ongoing operation of the powertrain and the operator torque request met by torque output from the electro-mechanical transmission, which concurrently spins the engine.

The method includes cylinder pressure sensing to accurately estimate compression ratio and piston position in situ, i.e., during ongoing operation. The method described herein is computationally simple, utilizing sensor outputs that are substantially linear or ratiometric, i.e., a sensor having an output that changes corresponding to a change in the monitored pressure. There is no requirement or need for calibrated sensors.

The method utilizes pressure ratio management (PRM), wherein a ratiometric measure of cylinder pressures for an engine is determined for fired and motored cylinders, as a function of piston position. Cylinder pressure signals are captured during compression and expansion strokes of the engine cycle, with the engine operating in firing mode, and in a motoring mode.

The cylinder pressure, COMB_PR, is preferably measured using the sensors 30 at several discrete crank angle locations at which cylinder volume is known. The cylinder volume can be determined at the crank angle locations using known slider equations and engine dimensions. At least two measurements are made prior to significant heat release, typically between 35 and 50 degrees bTDC, to determine the motoring pressure and signal bias related to polytropic equations, as discussed hereinbelow. Other measurements are made at crank angle locations appropriate to characterize combustion timing from the combustion ratio thereat. Another measurement is taken after combustion is complete, typically around 55 degrees aTDC.

It is assumed that a polytropic compression is used to reference the floating signal level. Polytropic compression is be expressed as follows:

$$PV^n = \text{CONSTANT} \quad (1)$$

wherein P comprises indicated pressure and V comprises cylinder volume at the piston position. For the PRM technique an ideal motoring pressure is computed through the entire engine cycle. Ideal motoring assumes that the exponent n is a constant and there is no heat loss.

The ratio of the pressure signal output for a fired cylinder, corrected for bias, divided by the pressure signal output for a motored cylinder at the same crank angle, results in a pressure ratio vs. crank angle whose characteristics are useable for engine control. The ratio process eliminates the need for knowing the gain of the sensor 30.

Figure 2:
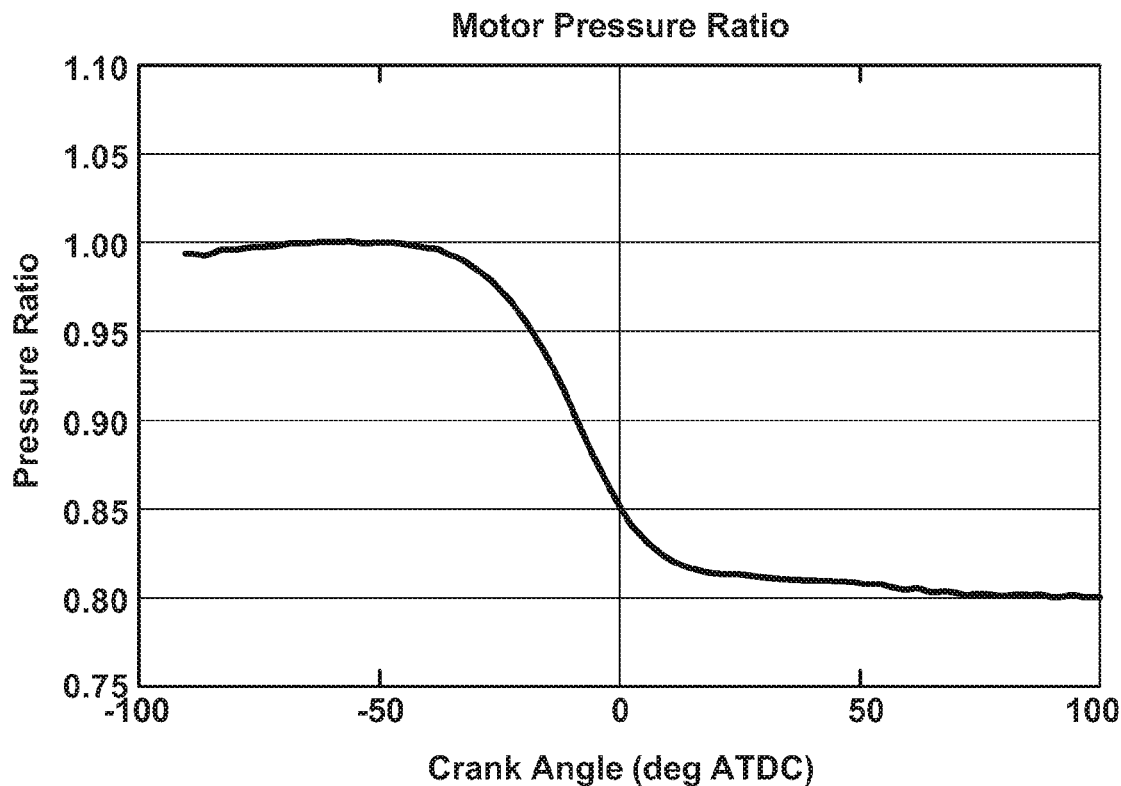

Referring now to FIG. 2, there is depicted a pressure ratio that has been computed from pressures measured from a non-firing diesel engine motored at 1000 rpm. The pressures have been divided by an "ideal motored pressure" computed from a polytropic calculation of the motored pressure with a value of n=1.365. This value of n is established as a reasonable value for air at the temperature corresponding to the temperature where the samples are taken to calculate any transducer bias, i.e., 50 crank angle degrees before top-dead-center (bTDC). This is demonstrated with reference to Eq. 2:

$$PV^n = P_0 V_0^n \quad (2)$$

wherein $P_0$ and $V_0$ comprise pressure and cylinder volume at zero crank degrees. An ideal compression with constant properties results in a constant value of one. Because of heat losses the pressure ratio in FIG. 2 is seen to fall below the ideal as the piston approaches TDC and thereafter. The results depicted with reference to FIG. 2 are referred to as a "motoring reference" and are generated from the engine with known compression ratios (cr) and an accurately positioned crank shaft position sensing system including an encoder.

Figure 3:
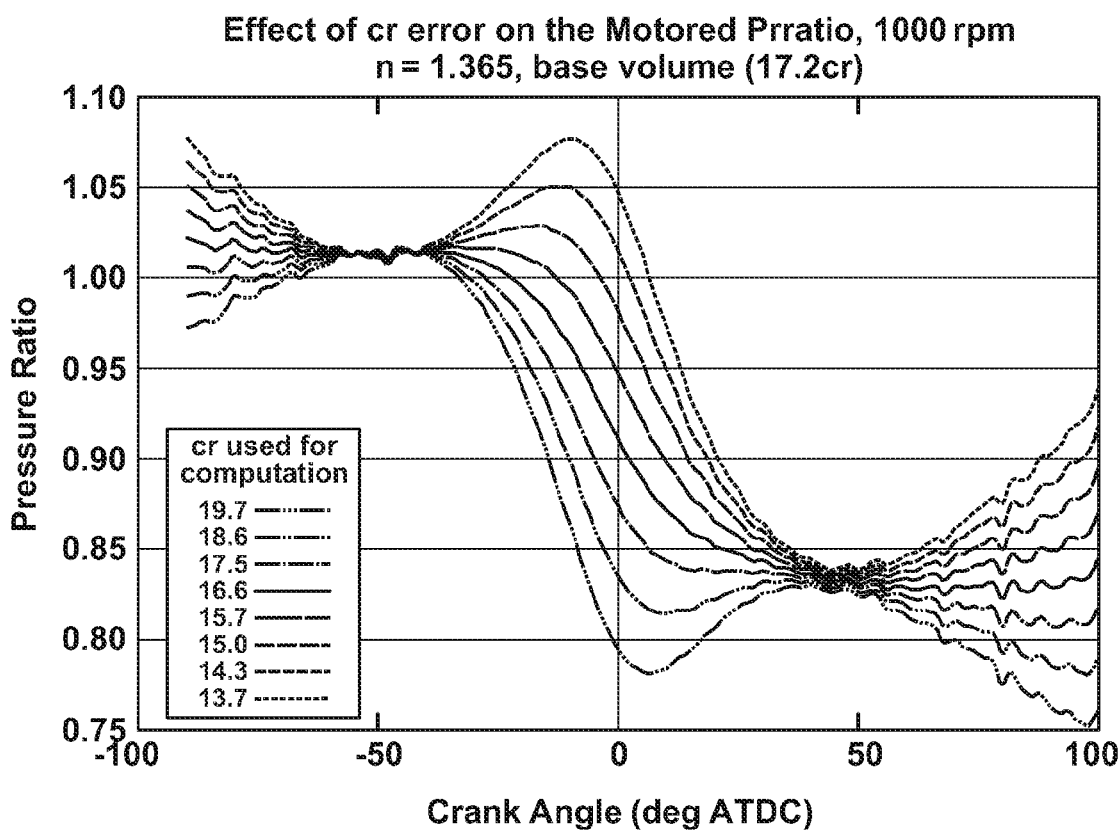

Referring now to FIG. 3, exemplary motoring pressure ratio states are depicted based upon crank angle, for a range of compression ratios (cr). The pressure ratio curves comprise recomputed pressure ratio states with altered clearance volumes (i.e., to represent error) thus generating the range of compression ratios depicted. Sensor bias is recomputed for each volume characteristic to yield a pressure ratio of 1.0 around 50 degrees bTDC. Although the bias is truly in error, the net effect is that at the corresponding timing in the range of 50 degrees aTDC the volume errors have a minimal effect on the pressure ratio value.

Figure 4:
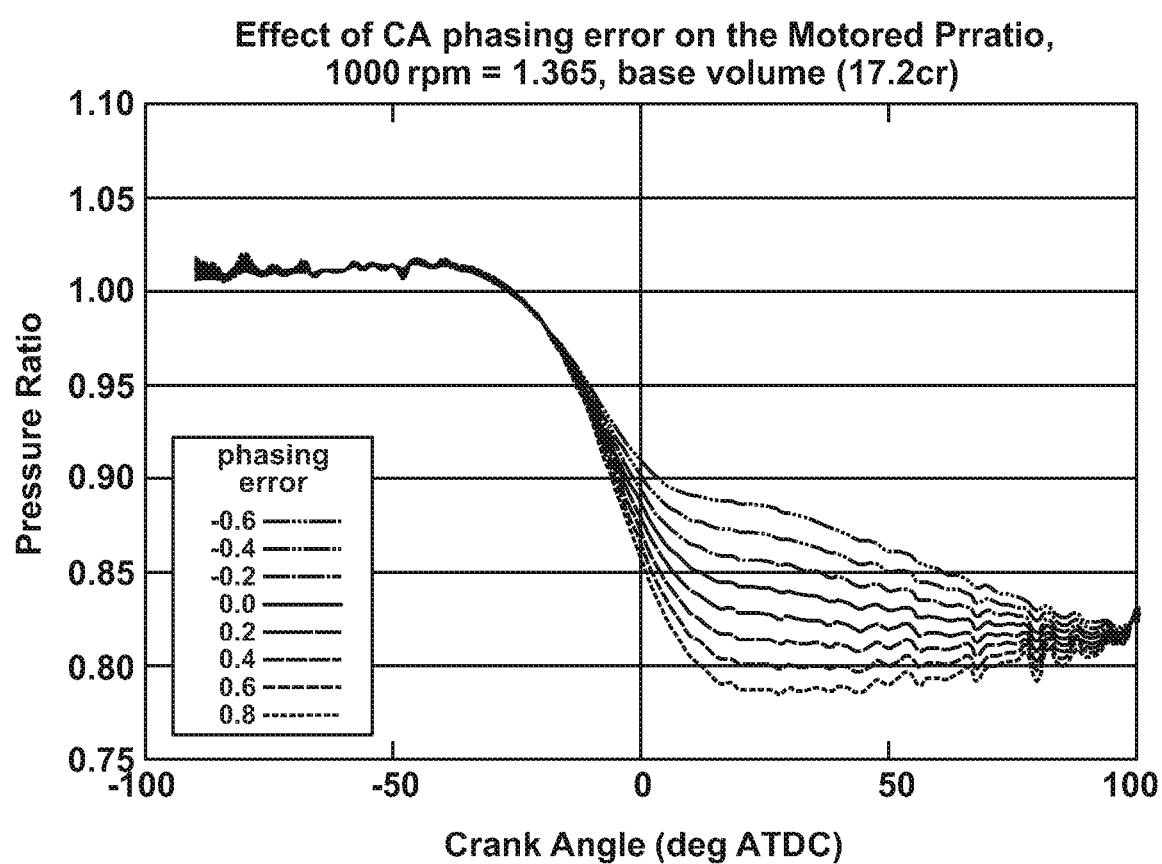

Referring now to FIG. 4, the reference motoring trace of FIG. 2 is recomputed with volumes determined with a crank angle error introduced, again computing a new bias for each of the curves. The output depicts effect of crank angle phasing errors on the motored pressure ratio. The results indicate that the phasing errors have a strong influence on the pressure ratio values after top-dead-center. Since compression ratio had a minimal influence on the pressure ratio value at 50 degrees aTDC it is reasonable to estimate any crank angle error by reading the pressure ratio and calculating the error based on the established reference motoring value at that crank angle and the pre-established sensitivity for the engine, as is indicated in FIG. 4.

Therefore, a corrected value of the pressure ratio value can be calculated using the phasing error established from the measurement at 50 degrees aTDC. A correct value for compression ratio is established from the characteristics of the pressure ratio curve in FIG. 4 or established from motoring calibration of the motoring reference curve with a range of altered compression ratios. Thus, the crank angle error (CA_error) for the exemplary engine is determined as in Eq. 3:

$$CA\_error = k1 * (0.78 - Pratio(50)) \quad (3)$$

wherein:

Pratio(50) comprises the pressure ratio value at 50 degrees aTDC;

k1 comprises a scalar correction factor, preferably derived during preproduction development; and, the scalar 0.78 is determined based upon the pressure ratio value at 50 degrees aTDC when the engine is motoring.

In like manner, the value of the pressure ratio at TDC, i.e. 0, is corrected, as determined in Eq. 4:

$$Pratio(Corrected) = Pratio(0) + CA\_error \cdot k2 \quad (4)$$

wherein Pratio(0) comprises the pressure ratio at TDC; and, k2 comprises a scalar correction factor, preferably derived during preproduction development.

All pressure data is derived using crank angle data which has been measured using the crank sensor 44 and multi-tooth target wheel 26. Therefore, the crank angle error is applied as an offset to the measured crank angle during ongoing operation to provide a corrected crank angle that accurately reflects engine crank angle and piston position derived therefrom. The corrected crank angle is used during ongoing engine operation to control crank-angle controlled engine actuators and for other control. Correspondingly, an error in compression ratio can be determined based upon the pressure ratio error and crank angle error, which can be used for engine control. Engine compression ratio monitoring can be used to monitor cylinder integrity to verify proper engine assembly, and confirm integrity of each cylinder, including gaskets, pistons, valves, piston rings, and other components. The compression ratio monitor can be applied during ongoing engine operation, during engine assembly, and during system evaluation and diagnosis during the service life of the engine.

Generally the intent of the method is for onboard corrections for use with pressure-based feedback control systems. The established errors are useable to adjust metrics from sampled pressures and readjust the calibration as it is affected by compression ratio and injection delivery timing readjustment. Engine actuators can be controlled based upon the determined crank angle error further, including controlling timing of fuel injection when the engine is operating in a compression-ignition mode, and controlling spark ignition timing when the engine comprises an engine that is selectively operative in either one of a spark-ignition mode or a compression ignition mode, such as a homogeneous charge compression ignition engine (HCCI). This includes controlling phasing of engine intake and exhaust valves via the aforementioned variable cam phasing system.

The method can be applied in situ, during ongoing operation in the service life of the engine, by disabling individual cylinders or all cylinders at appropriate times and conditions. In the exemplary system, the motoring reference was established for a 1000 RPM at a set coolant temperature. Any differences may have an influence on the motoring reference. The motoring reference (e.g., that depicted in FIG. 2) is preferably established for engine operating condition which are conveniently imposed.

Onboard methods can be applied to monitor integrity of the cylinder and/or the accuracy of the crank position sensing system. Beyond its application for onboard systems the method can be directly applied as a factory tool for monitoring manufacturing and assembly accuracy, resulting in adjustments to engine calibrations for a group of engines, an individual engine, and an individual cylinder. Similarly the method can be used as a service diagnostic tool.

While the invention has been described by reference to certain preferred embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. Method for controlling operation of an internal combustion engine, the engine ongoingly operative in repetitive cycles each cycle comprising intake, compression, expansion, and exhaust strokes, the method comprising:
   monitoring in-cylinder pressure and a corresponding engine crank position;
   operating the engine in a motoring mode and determining a plurality of instantaneous in-cylinder pressure states and corresponding engine crank positions;
   operating the engine in a cylinder firing mode and determining a plurality of instantaneous in-cylinder pressure states at the corresponding engine crank positions;
   determining a plurality of pressure ratios during ongoing engine operation at the corresponding engine crank positions based upon the instantaneous in-cylinder pressure states, each pressure ratio comprising a ratio between the instantaneous in-cylinder pressure state at the engine crank position determined when operating the engine in the motoring mode and the corresponding instantaneous in-cylinder pressure state at the engine crank position determined when operating the engine in the firing mode; and,
   determining an instantaneous crank angle error associated with the pressure ratios determined during the ongoing engine operation.

2. The method of claim 1, wherein operating the engine in a motoring mode comprises deactivating fuel flow to the engine while the engine is spinning.

3. The method of claim 2, wherein deactivating fuel flow to the engine while the engine is spinning comprises deactivating the fuel during an engine deceleration event.

4. The method of claim 2, wherein deactivating fuel flow to the engine while the engine is spinning further comprises spinning the engine with an electric machine.

5. The method of claim 1, further comprising applying the instantaneous crank angle error as an offset to the monitored engine crank position to determine a corrected crank angle during the ongoing engine operation.

6. The method of claim 5, further comprising controlling an engine actuator based upon the corrected crank angle.

7. The method of claim 6, wherein controlling an engine actuator based upon the corrected crank angle further comprises controlling timing of fuel injection when the engine is operating in a compression-ignition mode.

8. The method of claim 6, wherein controlling an engine actuator based upon the corrected crank angle further comprises controlling spark ignition timing when the engine comprises a spark-ignition engine.

9. The method of claim 5, wherein controlling an engine actuator based upon the corrected crank error further comprises controlling phasing of an engine intake valve.

10. Method to determine a position of a piston in a cylinder of an engine, said engine comprising a direct-injection, four-stroke, internal combustion engine including a variable volume combustion chamber defined by the piston reciprocating within the cylinder between top-dead-center and bottom-dead-center points and a cylinder head; the piston reciprocating in repetitive cycles each cycle comprising intake, compression, expansion, and exhaust strokes, the method comprising:
   adapting a plurality of pressure sensing devices to monitor in-cylinder pressure during ongoing operation;
   monitoring in-cylinder pressure and a corresponding engine crank position;

operating the engine in a motoring mode and determining a plurality of instantaneous in-cylinder pressure states and corresponding engine crank positions;

operating the engine in a cylinder firing mode and determining a plurality of instantaneous in-cylinder pressure states at the corresponding engine crank positions;

determining a plurality of pressure ratios at the corresponding engine crank positions based upon the instantaneous in-cylinder pressure states, each pressure ratio comprising a ratio between the instantaneous in-cylinder pressure state at the engine crank position determined when operating the engine in the motoring mode and the corresponding instantaneous in-cylinder pressure state at the engine crank position determined when operating the engine in the firing mode;

determining an instantaneous crank angle error associated with the pressure ratios determined during the ongoing engine operation; and, adjusting the monitored engine crank position based upon the instantaneous crank angle error.

11. The method of claim 10, further comprising:

determining a compression ratio error based upon the pressure ratios; and, monitoring cylinder integrity based upon the compression ratio error.

12. Method to determine a position of a piston in a cylinder of an engine, said engine comprising a direct-injection, four-stroke internal combustion engine including a variable volume combustion chamber defined by the piston reciprocating within the cylinder between top-dead-center and bottom-dead-center points and a cylinder head; the piston reciprocating in repetitive cycles each cycle comprising intake, compression, expansion, and exhaust strokes, the method comprising:

adapting a plurality of pressure sensing devices to monitor in-cylinder pressure during ongoing operation;

operating the engine lean of stoichiometry;

monitoring in-cylinder pressure and a corresponding engine crank position;

operating the engine in a motoring mode and determining a plurality of instantaneous in-cylinder pressure states and corresponding engine crank positions;

operating the engine in a cylinder firing mode and determining a plurality of instantaneous in-cylinder pressure states at the corresponding engine crank positions;

determining a plurality of pressure ratios at the corresponding engine crank positions based upon the instantaneous in-cylinder pressure states, each pressure ratio comprising a ratio between the instantaneous in-cylinder pressure state at the engine crank position determined when operating the engine in the motoring mode and the corresponding instantaneous in-cylinder pressure state at the engine crank position determined when operating the engine in the firing mode;

determining an instantaneous crank angle error associated with the pressure ratios determined during the ongoing engine operation; and, adjusting the monitored engine crank position based upon the instantaneous crank angle error.

13. The method of claim 12, wherein operating the engine in the motoring mode comprises deactivating fuel flow to the engine while the engine is spinning.

14. The method of claim 13, wherein operating the engine in the cylinder firing mode comprises activating fuel flow to the engine.

15. The method of claim 12, further comprising:

operating the engine in the motoring mode and in the cylinder firing mode during the ongoing engine operation;

determining the plurality of pressure ratios based upon the instantaneous in-cylinder pressure states determined during the ongoing engine operation;

determining the instantaneous crank angle error associated with the pressure ratios determined during the ongoing engine operation; and, adjusting the monitored engine crank position based upon the instantaneous crank angle error during the ongoing engine operation.

16. The method of claim 12, further comprising an engine and control module operative to execute the method.

* * * * *